H. PAULSON.
COFFEE COOKING DEVICE.
APPLICATION FILED JULY 25, 1911.
1,024,145.
Patented Apr. 23, 1912.
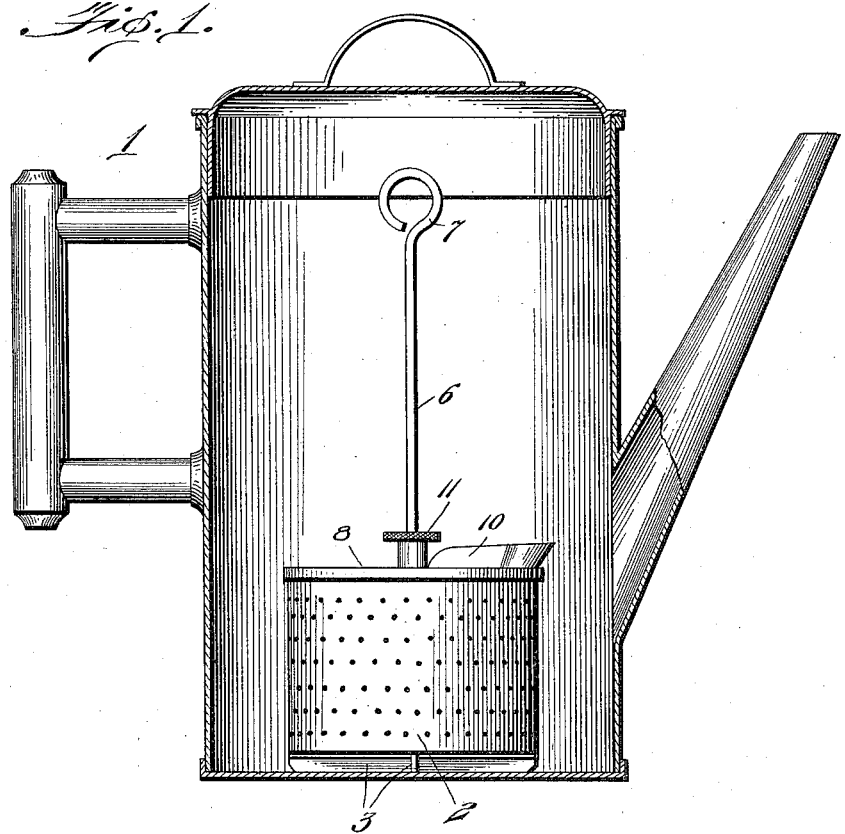
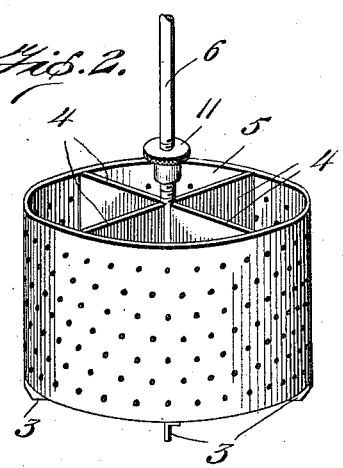
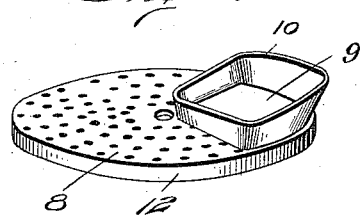
Inventor
Hans Paulson

UNITED STATES PATENT OFFICE.

HANS PAULSON, OF ORTING, WASHINGTON.

COFFEE-COOKING DEVICE.

1,024,145.  Specification of Letters Patent.  Patented Apr. 23, 1912.

Application filed July 25, 1911. Serial No. 640,503.

*To all whom it may concern:*

Be it known that I, HANS PAULSON, a citizen of the United States, residing at Orting, in the county of Pierce and State of Washington, have invented certain new and useful Improvements in Coffee-Cooking Devices; and I do hereby declare the following to be a full, clear, and exact description of the invention, such as will enable others skilled in the art to which it appertains to make and use the same.

This invention relates to new and useful improvements in coffee retaining receptacle to be placed into a coffee pot.

The object of this invention is to provide a device of this character with several compartments for containing coffee whereby the coffee may be used several times, and when making coffee each time new coffee may be added, thereby not only saving the coffee but using the same amount at each time.

Another object of this invention is to improve and simplify devices of this character rendering them comparatively cheap in manufacture, strong, durable and efficient in use and which may be readily operated.

With these and other objects in view, my invention consists of a novel construction, combination and arrangement of parts which will be hereinafter fully described, claimed and particularly pointed out in the drawings in which:

Figure 1 is a side elevation of my improved device as applied to a coffee pot; Fig. 2 is a perspective view of the same having the cover removed, and Fig. 3 is a perspective view of the cover.

Referring now to the drawing wherein like parts are indicated by like references, the numeral 1 indicates generally a coffee pot of the usual design having a coffee retaining member 2 which embodies my invention. This coffee containing member 2 consists of a circular receptacle made of any suitable material having perforations formed in the sides and bottom thereof. Angle bars or supporting members 3 are suitably secured to the bottom of the receptacle by means of solder or the like. Radially extending partitions 4 are formed in said receptacle for dividing the same into compartments 5, and whereas I have only shown four of these compartments it is to be understood that the receptacle may be divided into as many compartments as desired. Extending from these partitions is a stem 6 having an eye 7 formed in the end thereof by which the receptacle may be removed or placed in the coffee pot. A suitable closure 8 is rotatably mounted on the said stem which is also provided with perforations and has formed therein a sector shaped opening 9. A dependent flange 12 is formed on said closure to fit over the sides of the receptacle 2, and a nut 11 is provided on said stem for holding the said closure close to the receptacle. The edges of the closure around the sector shaped opening are provided with outwardly extending flanges 12 which serve as a funnel to facilitate the pouring of the ground coffee into the receptacle.

It is obvious from the foregoing that three of the compartments may be filled with coffee and the receptacle is then placed into the coffee pot. But upon making coffee the second time the empty compartment is then filled with fresh ground coffee and the closure is turned until the sector shaped opening comes over the next compartment and the coffee in that compartment is then emptied. This operation is continued and thereby all of the flavor will be boiled out of the coffee before it is thrown away.

Having described my invention and what I claim is new and desire to secure by Letters Patent is:

In a device such as described a perforated receptacle, radially extending partitions for dividing same into compartments, a stem extending from the said partitions, a perforated cover rotatably mounted on said stem, a flange formed on said cover extending over the edges of the receptacle, said cover having a sector shaped opening formed therein and outwardly extending flanges formed around the edges of said opening substantially as described.

In testimony whereof I affix my signature in presence of two witnesses.

HANS PAULSON.

Witnesses:
 JESSIE ALLISON,
 FAY WOOLERY.

Copies of this patent may be obtained for five cents each, by addressing the "Commissioner of Patents, Washington, D. C."